United States Patent
Zabaleta

(10) Patent No.: US 7,537,034 B2
(45) Date of Patent: May 26, 2009

(54) AUTOMOTIVE WHEEL WITH CONTINUOUS BARREL SURFACE

(76) Inventor: Daniel A. Zabaleta, 1260 Meadows Blvd., Weston, FL (US) 33327

( * ) Notice: Subject to any disclaimer, the term of this patent is extended or adjusted under 35 U.S.C. 154(b) by 169 days.

(21) Appl. No.: 11/455,536

(22) Filed: Jun. 19, 2006

(65) Prior Publication Data

US 2007/0290549 A1    Dec. 20, 2007

(51) Int. Cl.
*B60C 7/24* (2006.01)
*B60B 21/00* (2006.01)

(52) U.S. Cl. .................................... 152/396; 301/95.11

(58) Field of Classification Search ........... 301/9.1–9.2, 301/10.1, 11.1–11.3, 23, 29.2, 35.1–35.3, 301/35.51, 95.11, 99–101; 152/386–391, 152/396, 399
See application file for complete search history.

(56) References Cited

U.S. PATENT DOCUMENTS

| | | | |
|---|---|---|---|
| 4,181,169 A * | 1/1980 | Grawey et al. ............. 301/11.1 |
| 4,505,314 A * | 3/1985 | Goudy ......................... 152/398 |
| 4,989,657 A * | 2/1991 | Lipper ......................... 152/399 |
| 6,763,865 B1 * | 7/2004 | Bernoni ....................... 152/396 |
| 7,073,871 B2 * | 7/2006 | Hamada ..................... 301/10.1 |
| 2003/0080609 A1 * | 5/2003 | Darnell ..................... 301/95.11 |
| 2004/0021365 A1 | 2/2004 | Georgeff |
| 2005/0236081 A1 * | 10/2005 | Marsaly et al. ............. 152/396 |

* cited by examiner

*Primary Examiner*—Jason R Bellinger
(74) *Attorney, Agent, or Firm*—Gold & Rizvi, P.A.; Glenn E. Gold; H. John Rizvi

(57) ABSTRACT

An automotive wheel assembly that has a smooth, flush or continuous, transition surface between an outer wheel barrel and an inner wheel barrel, to enhance the aesthetic appearance of the automotive wheel is fabricated by a modification to the wheel design, construction, assembly and/or finishing process to impart a uniform aesthetic appearance throughout the inner and outer barrels of the wheel and a seamless transition, or "endless lip effect," between the inner and outer barrels of the wheel. Various embodiments of the design incorporate one-piece, two-piece and three-piece automotive wheel assemblies.

21 Claims, 14 Drawing Sheets

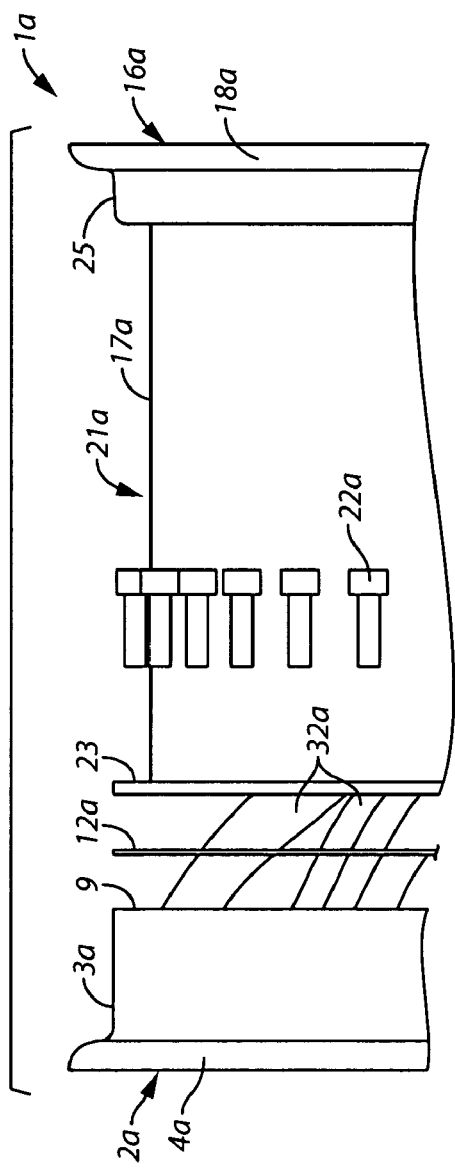
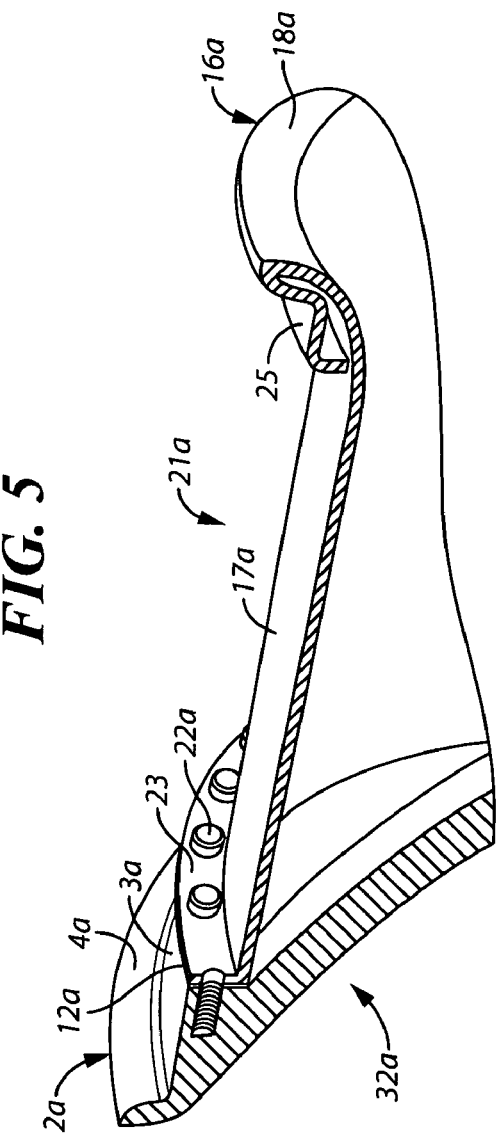

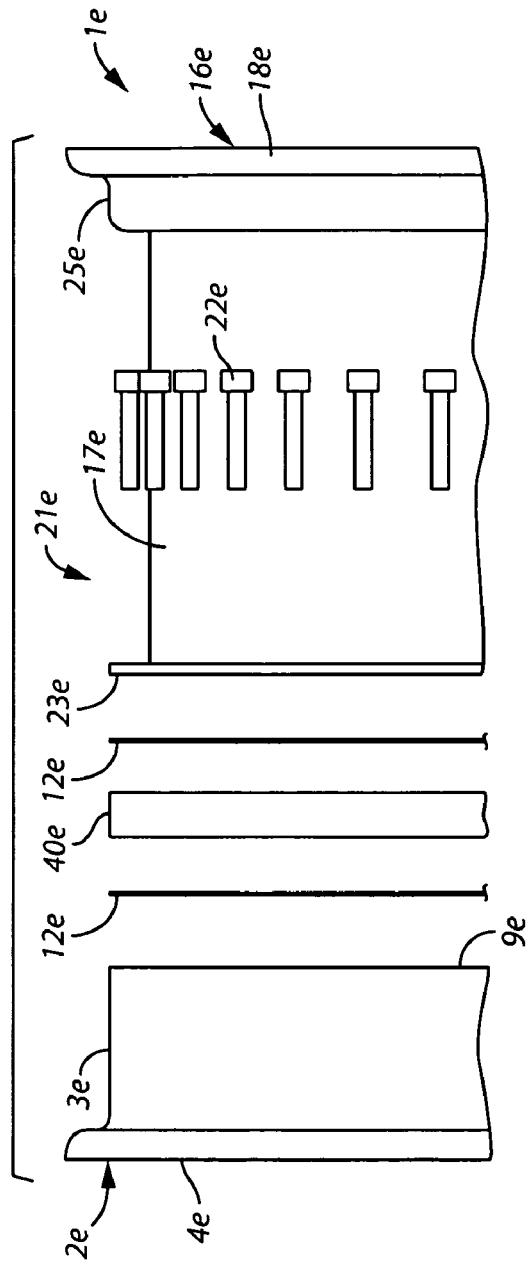
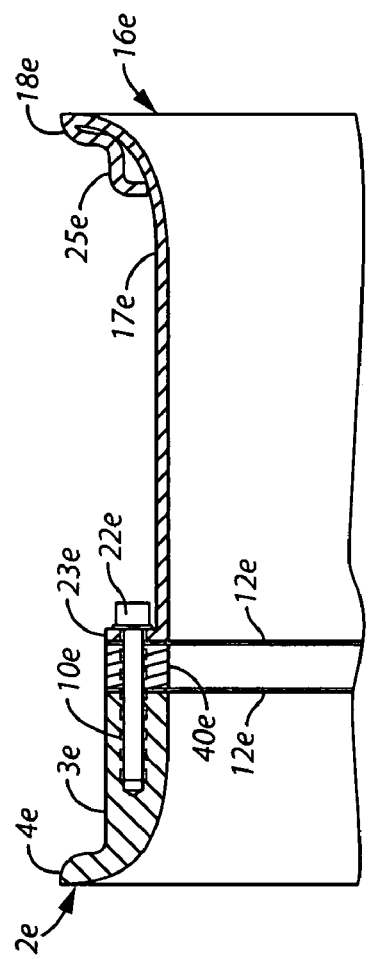

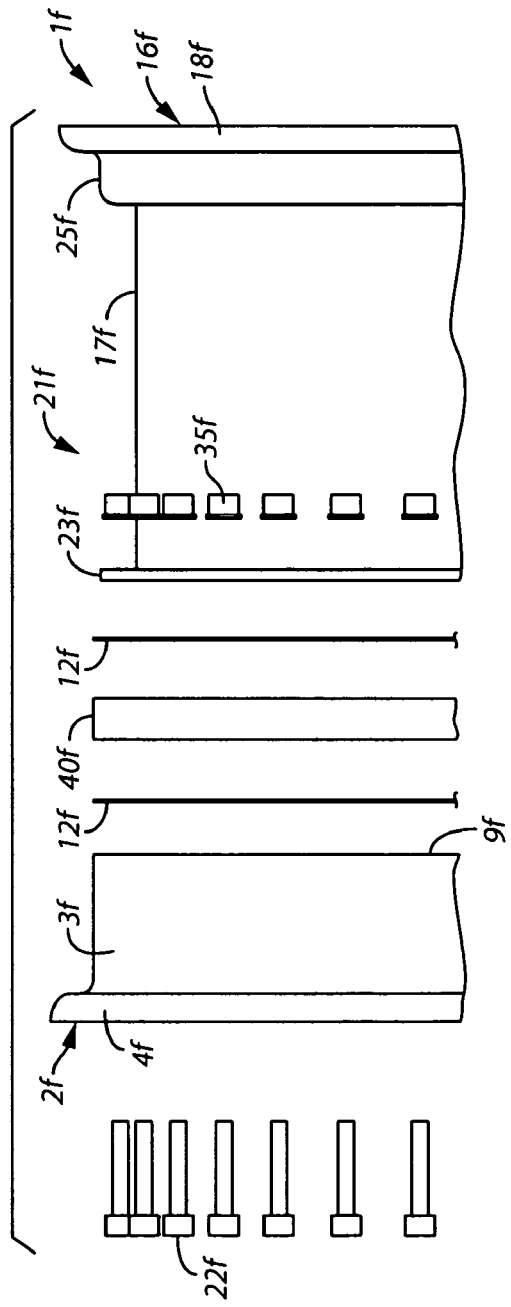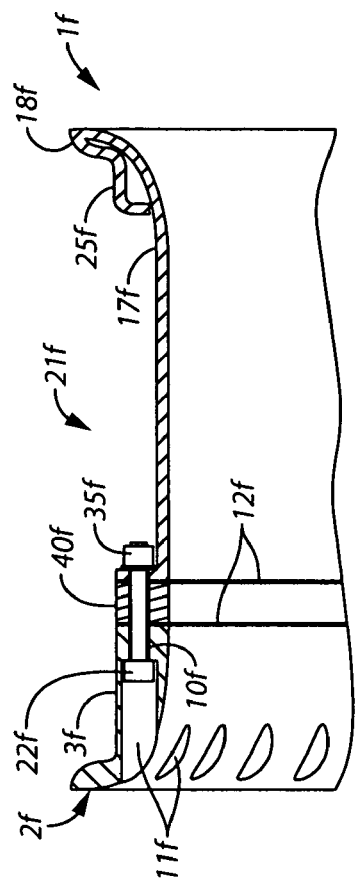
FIG. 19
FIG. 20

AUTOMOTIVE WHEEL WITH CONTINUOUS BARREL SURFACE

FIELD OF THE INVENTION

The present invention relates to automotive wheels. More particularly, the present invention relates to an automotive wheel that has a smooth, flush or continuous, surface between an outer wheel barrel and an inner wheel barrel portions, as well as other features to impart a uniform aesthetic appearance throughout the inner and outer barrel portions of the wheel assembly.

BACKGROUND OF THE INVENTION

Automotive wheels may be one of various types depending on structural characteristics and methods of manufacture. The various types of automotive wheels include but are not limited to the singe-piece, two-piece modular and three-piece modular designs. In typical fabrication of each of the various types of automotive wheels, the wheel includes a wheel disk that has a wheel face that faces the outboard side of the wheel and a hub plate that faces the inboard side of the wheel and is used for installing the wheel assembly on the vehicle. Additionally it includes an outer barrel that faces the outboard side of the wheel, or face side, and also inner barrel which faces the inboard side, or brake side, of the wheel. The wheel disk is located between or within the inner and outer barrels, thus the axial location of the wheel disk in most cases defines the point were the inner and outer barrels meet. Therefore, the outer barrel and wheel face, as the typically more visible portions of the wheel, are conventionally subjected to more intense polishing, smoothing and finishing efforts than the inner barrel. The transition or assembly point between the outer and inner barrels is typically visible as a continuous seam or protrusion, which detracts somewhat from the overall aesthetic appearance of the wheel.

Single-piece automotive wheels are typically cast in a mold, flow-formed or machined from out of forged metal. Frequently, single-piece automotive wheels are fabricated to include a fake hardware ring (hereinafter referred to as HWR), also known as an annular ring. A fake HWR can be used to impart a faux modular appearance to the wheel, to help conceal the lack of finishing detail given to the inner or brake side of the wheel, or to utilize the casting seam, if any, as part of the wheel design.

After casting of a single-piece wheel, a casting seam exists where the casting mold halves came together, usually were the inner and outer barrel portions of the wheel meet. Depending on the wheel design, the casting seam may be shaped to resemble an HWR or, alternatively, may be left in a flat contour by making the mold halves fit together in a flush configuration. If the casting seam is left in a flush configuration, a distinct line will be apparent on the wheel surface between the inner and outer barrels.

Single-piece wheels are finished as a complete assembly insofar as the entire wheel is painted the same color or chromed in its entirety after manufacture. The texture and quality of the casting mold surfaces, as well as the preparation procedures which are carried out prior to finishing, determine the texture and quality of the final wheel finish. The inner barrel portion of the wheel, concealed by the face of the wheel and the HWR or casting seam, is not prepared to the level of aesthetic detail or quality, which characterizes the outer barrel and wheel face after finishing. This effectively renders the inner barrel less aesthetically pleasing than the outer barrel, since the inner barrel is left with a rough and dull appearance.

On the wheel disk of a two-piece modular automotive wheel, the HWR extends around the perimeter of the wheel disk and is necessary for assembly of the wheel parts since the HWR includes bolt openings, which match those provided on a barrel hardware flange on the barrel. Therefore, the HWR creates an obvious boundary between the inner and outer portions of the barrel of the wheel. The outer portion of the barrel, located on the outboard side of the HWR, is fully visible; therefore, it is desirable for the outer barrel portion to be as aesthetically pleasing as possible. The inner barrel includes the tire mounting depression, necessary to provide clearance to mount the tire on to the wheel assembly, and is located on the inboard side of the HWR. The inner barrel is obscured by the wheel face and the HWR and requires the inclusion of the tire mounting depression; therefore, the aesthetic appearance of the inner barrel is typically not considered a high priority to wheel manufacturers.

U.S. Patent Application Publication Number US2004/0021365A1 discloses a two-piece vehicle wheel having a barrel section with separate wheel disk secured therein by separate fasteners, which are hidden from view when the wheel is in use. However, the disclosed assembly does not utilize the barrel curvature proposed by the present invention, and therefore requires the inclusion of the tire mounting depression, aesthetically hampering the inner barrel.

On the wheel disk of a three-piece modular automotive wheel, as in the case of a two-piece modular wheel, the HWR extends around the perimeter of the wheel disk and is necessary for assembly of the wheel parts since the HWR includes bolt openings which match those provided on a barrel hardware flange on the barrels. Therefore, the HWR creates an obvious boundary between the inner and outer barrels of the wheel. The outer barrel of the three-piece modular wheel includes an outer flange, a tire bead seat and a hardware flange having bolt openings that match respective bolt openings on the inner barrel and the HWR for assembly. The outer barrel is fully visible; therefore, it is highly desirable that the outer barrel be as aesthetically pleasing as possible.

The inner barrel of a three-piece modular wheel includes an inner flange, a tire bead seat and a hardware flange having bolt openings, which match the respective bolt openings on the outer barrel and the HWR for assembly. The inner barrel also includes a tire mounting depression immediately to the inside of the tire bead seat, to facilitate mounting of a tire on the wheel. Because the wheel face and the HWR largely obscure it and requires the inclusion of the tire mounting depression, the inner barrel is not considered an aesthetic portion of the wheel, and therefore, remains unfinished.

In some wheel face designs and on some larger-diameter wheels, however, the inner barrel is largely visible, and therefore, requires some finishing treatment. In some cases, this is accomplished by chroming the inner barrel, although to a lesser degree of detail or quality than the outer barrel. Even then, the wheel's face, HWR, and tire mounting depression are still present, separating the outer and inner barrels and making it less necessary to subject the inner barrel to the full finishing process. Therefore, an automotive wheel is needed which is fabricated by a modification of the wheel design, construction, assembly and/or finishing process to impart a uniform aesthetic appearance and a coherent transition throughout both the inner and outer barrels of the wheel, or "endless lip effect." As used herein, the term "lip" is intended to describe the portion of the outer barrel measured from the outboard flange to the location of the wheel disk HWR or annular ring. The absence of HWR or annular ring on the wheel along with the uniform aesthetic appearance between the inner and outer barrel halves of the wheel provide the aforementioned "endless lip effect."

SUMMARY OF THE INVENTION

The present invention is generally directed to an automotive wheel having a continuous, aesthetically-pleasing barrel surface and which is fabricated by a modification to the wheel design, construction, assembly and/or finishing process to impart a uniform aesthetic appearance throughout the inner and outer barrels of the wheel and a seamless transition, or "endless lip effect," between the inner and outer barrels of the wheel. In one aspect of the invention, the automotive wheel with continuous barrel surface comprises:

an inner barrel having an inboard flange;
an outer barrel having an outboard flange;
a tire mounting depression between the inboard flange and the outboard flange; and
a generally seamless transition between the inner barrel and the outer barrel's visible surfaces.

In another aspect of the invention, the automotive wheel with continuous barrel surface is a one-piece automotive wheel.

In still another aspect of the invention, the automotive wheel with continuous barrel surface is a two-piece automotive wheel.

In yet another aspect of the invention, the automotive wheel with continuous barrel surface is a three-piece automotive wheel.

In still another aspect of the invention, the automotive wheel with continuous barrel surface has a seamless transition between the inner barrel and the outer barrel.

In yet another aspect of the invention, the automotive wheel with continuous barrel surface has inner and outer barrels, which are subjected to the same type and intensity of aesthetic treatment to impart a uniform appearance to the automotive wheel.

In still another aspect of the invention, the automotive wheel with continuous barrel surface includes inner and outer barrels secured to each other using hidden flanges and bolts to impart a generally continuous surface or seamless transition between the inner and outer barrels.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 5 is a side exploded view, partially in section, of the two-piece automotive wheel with continuous barrel surface shown in FIG. 4, illustrating a typical technique for attaching the outer barrel to the inner barrel of the automotive wheel;

FIG. 6 is a rear perspective longitudinal sectional view of the two-piece automotive wheel with continuous barrel surface shown in FIG. 4;

FIG. 16 is an exploded side view, partially in section, of the three-piece embodiment of the automotive wheel with continuous barrel surface shown in FIG. 15;

FIG. 17 is a longitudinal sectional view, partially in section, of the three-piece embodiment of the automotive wheel with continuous barrel surface shown in FIG. 15;

FIG. 19 is an exploded side view, partially in section, of the three-piece embodiment of the automotive wheel with continuous barrel surface shown in FIG. 18; and FIG. 20 is a longitudinal sectional view, partially in section, of the three-piece embodiment of the automotive wheel with continuous barrel surface shown in FIG. 18.

DETAILED DESCRIPTION OF THE PREFERRED EMBODIMENTS

Shown throughout the Figures, the present invention is generally directed to various embodiments of an automotive wheel having a continuous, aesthetically-pleasing barrel surface throughout the inner and outer barrel portions of the automotive wheel. The automotive wheel of this invention is fabricated through a modification to the conventional wheel design, construction, assembly and/or finishing process to impart a uniform aesthetic appearance throughout the inner and outer barrels of the wheel and a seamless transition, or "endless lip effect," between the inner and outer barrels of the wheel.

Figure 1:
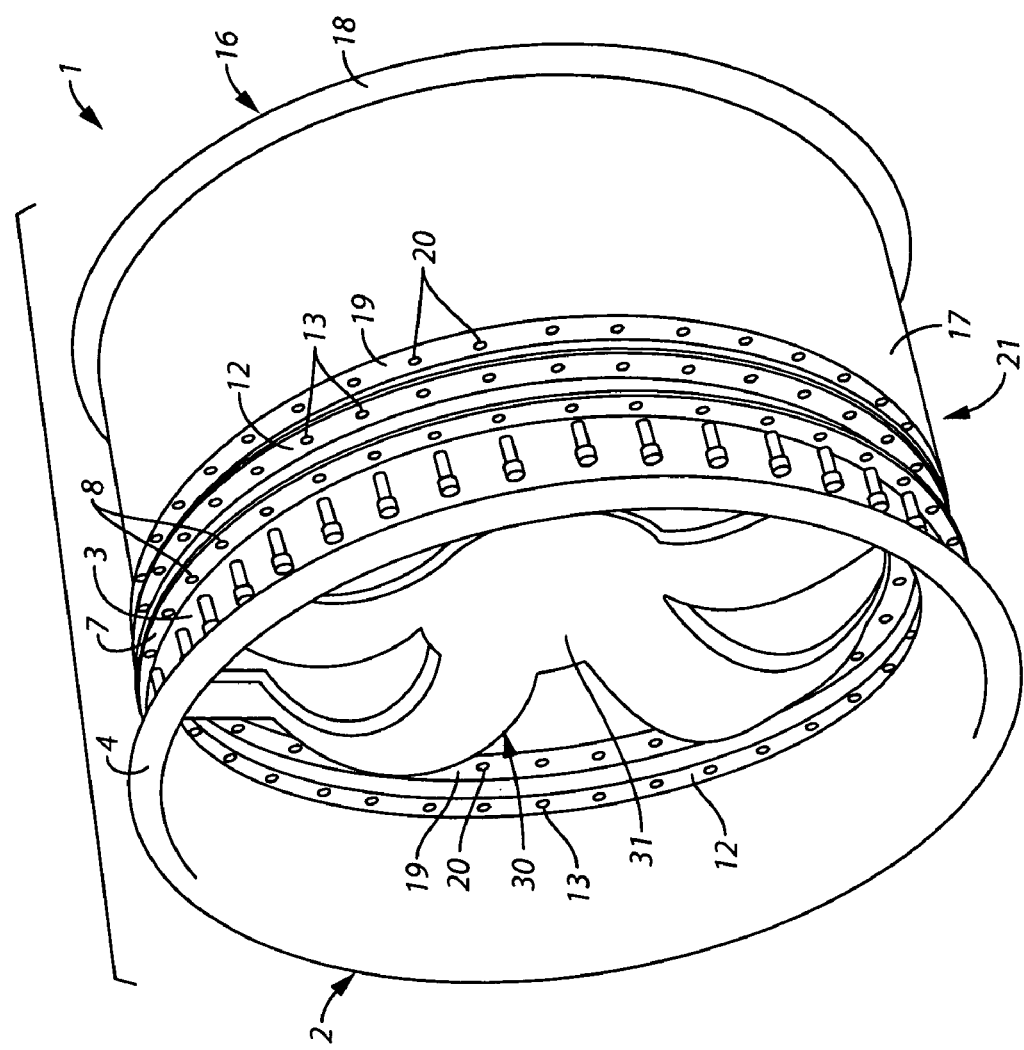
FIG. 1 is a front exploded, perspective view of a first two-piece embodiment of the automotive wheel with continuous barrel surface according to the present invention.
Figure 2:
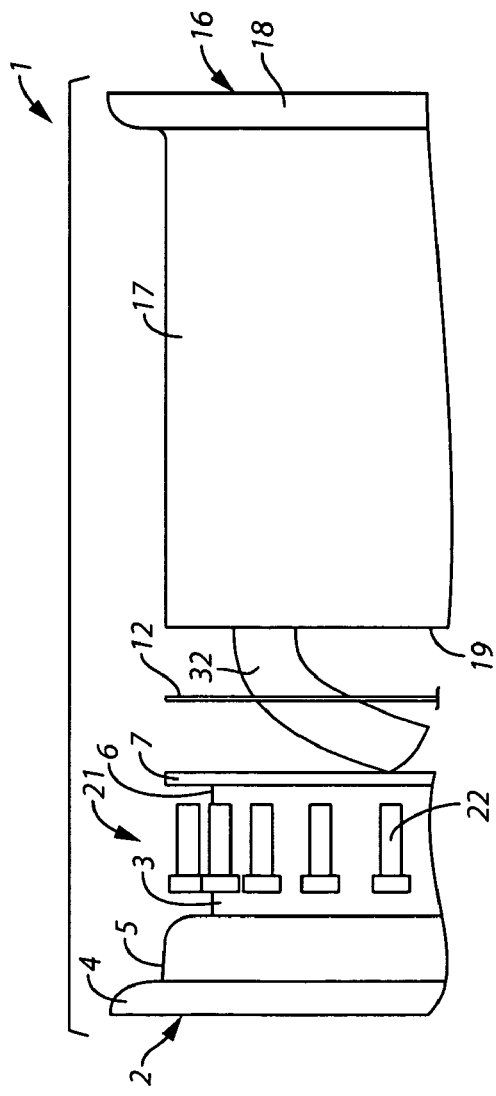
FIG. 2 is a side exploded view, partially in section, of the two-piece automotive wheel with continuous barrel surface shown in FIG. 1, illustrating a typical method of attaching the outer barrel to the inner barrel of the automotive wheel.
Figure 3:
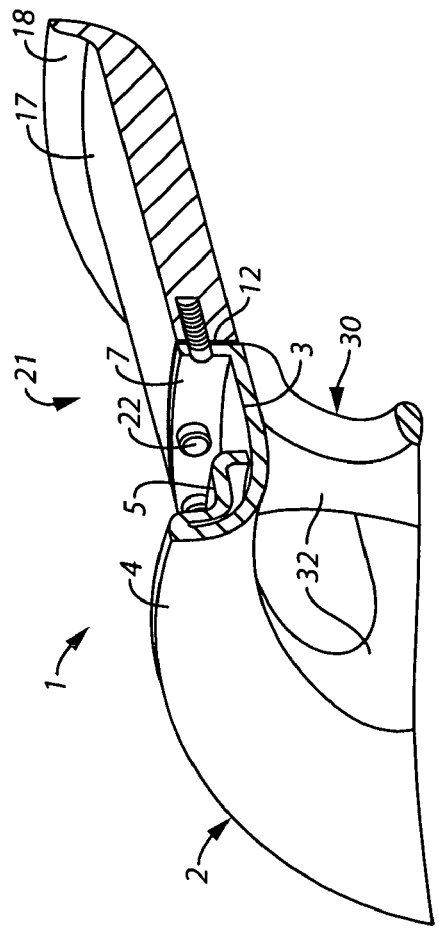
FIG. 3 is a front perspective longitudinal sectional view of the automotive wheel with continuous barrel surface shown in FIG. 1.

Referring initially to FIGS. 1-3 of the drawings, a first two-piece embodiment of the automotive wheel with continuous barrel surface, hereinafter two-piece automotive wheel, of the present invention is generally indicated by reference numeral 1. The two-piece automotive wheel 1 typically includes metal components and has an outer barrel 2 that is attached to an inner barrel 16 typically in a manner, which will be hereinafter described. The outer barrel 2 includes a generally cylindrical outer barrel body 3. The outer edge of the barrel body 3 is typically folded over to form an annular, flared outboard flange 4 and an annular outboard tire bead seat 5 adjacent to the outboard flange 4, as illustrated in FIG. 3. An annular barrel hardware flange 7 is provided along the inner edge of the barrel body 3, in spaced-apart relationship to the outboard bead seat 5. A barrel tire mounting depression 6 extends between the outboard tire bead seat 5 and the barrel hardware flange 7. As illustrated in FIG. 1, multiple flange bolt openings 8 extend through the barrel hardware flange 7, in spaced-apart relationship to each other for purposes that will be hereinafter described.

Figure 14:
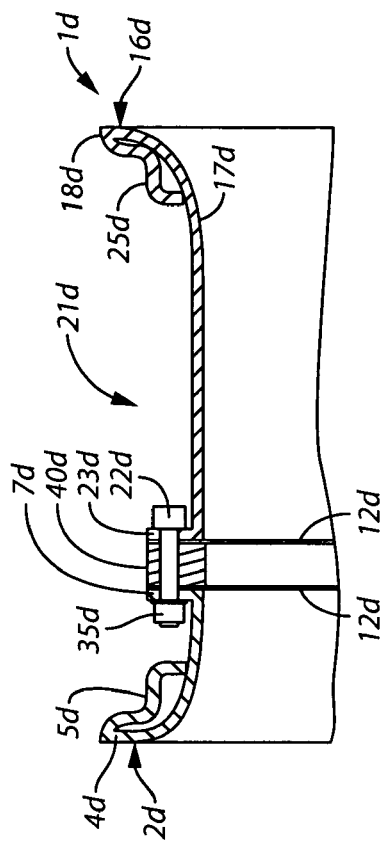
FIG. 14 is a longitudinal sectional view, partially in section, of the three-piece embodiment of the automotive wheel with continuous barrel surface shown in FIG. 12.

It is significant to note that the structure of, and method of forming, the outboard flanges and outboard tire bead seats of the various embodiments of the wheel assembly of the present invention, as described and shown herein, is merely exemplary and is by no means meant to limit the scope of the invention. That is, in lieu of forming these structures by folding over the outer edge of the barrel body, alternative tire bead seat structures may be used. Referring briefly to FIG. 14, one such alternative bead seat structure will now be described. In FIG. 14, the outboard edge of the outer barrel body 3d is folded over to form an annular, flared outboard flange 4d and an annular outboard bead seat 5d adjacent to the outboard flange 4d. Alternatively, the outboard tire bead seat 5d may be subsequently added in the form of an independent annular ring structure at a position along the outer barrel body 3d where it would be adjacent to the outboard flange 4d. The annular ring structure, which should preferably be constructed from a plastic, composite, or other structurally adequate lightweight material, may be configured to enable attachment to the outer barrel 3d using mechanical fasteners, chemical adhesives and any other known means. Furthermore, such attachment may include providing an interlocking, interlinking or other direct interconnecting engagement between the tire bead seat 5d and the outer barrel body 3d. The annular structure itself may be comprised of two or more sections, or lengths, capable of being efficiently assembled to form the contiguous annular ring. For instance, it may be preferable to incorporate this bead seat structure into various embodiments of the wheel assembly of the present invention to, among other things, improve manufacturability, reduce manufacturing costs, and reduce the overall weight of the wheel assembly.

The inner barrel 16 includes a generally cylindrical inner barrel body 17. An annular inboard flange 18 extends from the inner edge of the inner barrel body 17. The inner barrel body 17 further includes an outer edge 19, into which extend multiple spaced-apart edge bolt openings 20 which correspond to the respective flange bolt openings 8 in the barrel hardware flange 7 of the outer barrel 2. An annular gasket 12, which may be Teflon, for example, includes multiple, spaced-apart gasket bolt openings 13 which correspond to the respective flange bolt openings 8 of the barrel hardware flange 7 and the edge bolt openings 20 of the inner barrel body 17. As will be apparent to those skilled in the art, various alternative sealing means can be used, in lieu of the annular gasket 12. In fact, it is preferred that sealing between edge 19 and flange 7 is achieved using a resilient O-ring, in which case complementary O-shaped recessed channels (not shown) are along the respective edge 19, for seating of the O-ring therein. When fully assembled, compression of the O-ring would affect adequate sealing between the aforementioned structural surfaces. For example, making particular reference to FIGS. 12-14, O-shaped depressions (not shown) may be provided on both sides hardware ring 40d, adjacent to the ringbolt openings 41d, each sized and shaped to receive an O-ring gasket (not shown). During assembly, the hardware ring 40d, with O-ring gaskets seated in the respective hardware ring depressions is interposed between the outer barrel 2d and the inner barrel 16d. Upon securing the outer barrel 2d, the hardware ring 40d, and the inner barrel 16d together, the O-ring is compressed within the interior space formed between the ring depressions and the respective outer barrel 2d hardware flange 7d and the inner barrel 16d hardware flange 23d. The incorporation of the aforementioned O-ring configuration, as an alternative to the gasket-type arrangement, is beneficial in that it enables metal-to-metal contact between the wheel assembly structural components, i.e., the inner and outer barrels and the hardware ring. Obviously, the location of the O-ring depressions and the corresponding positioning of the resilient O-ring, will vary depending upon the particular wheel assembly embodiment of the present invention. For instance, in the two-piece wheel assembly shown in FIGS. 1-3, O-ring depressions may be located on the barrel edge 19 and seal against hardware flange 7. Likewise, in the two-piece wheel assembly shown in FIGS. 4-6, O-ring depressions may be located on the outer barrel 2a edge 9 and inner barrel 16a hardware flange 23.

Figure 12:
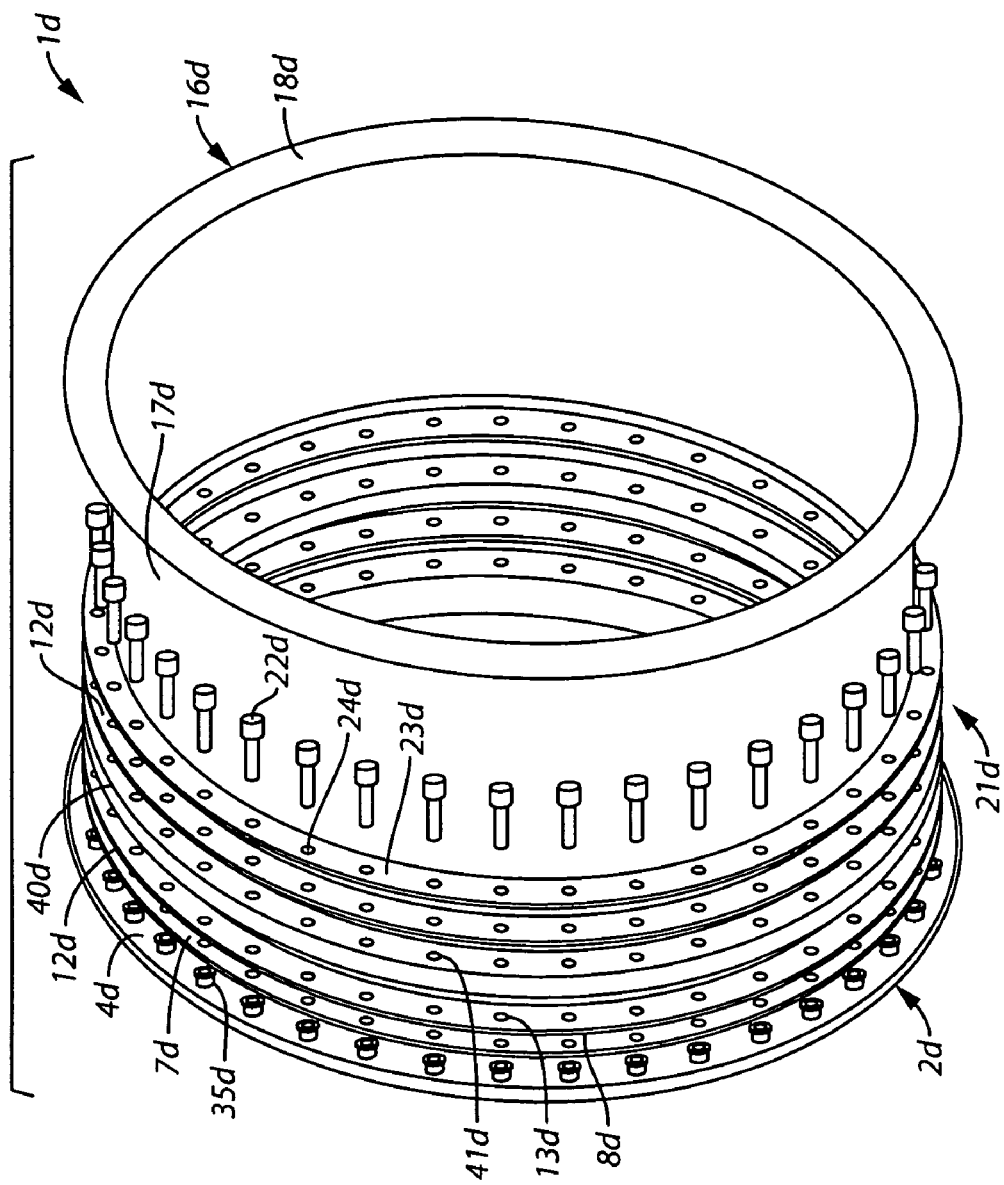
FIG. 12 is a rear, exploded perspective view of a first three-piece embodiment of the automotive wheel with continuous barrel surface according to the present invention.
Figure 13:
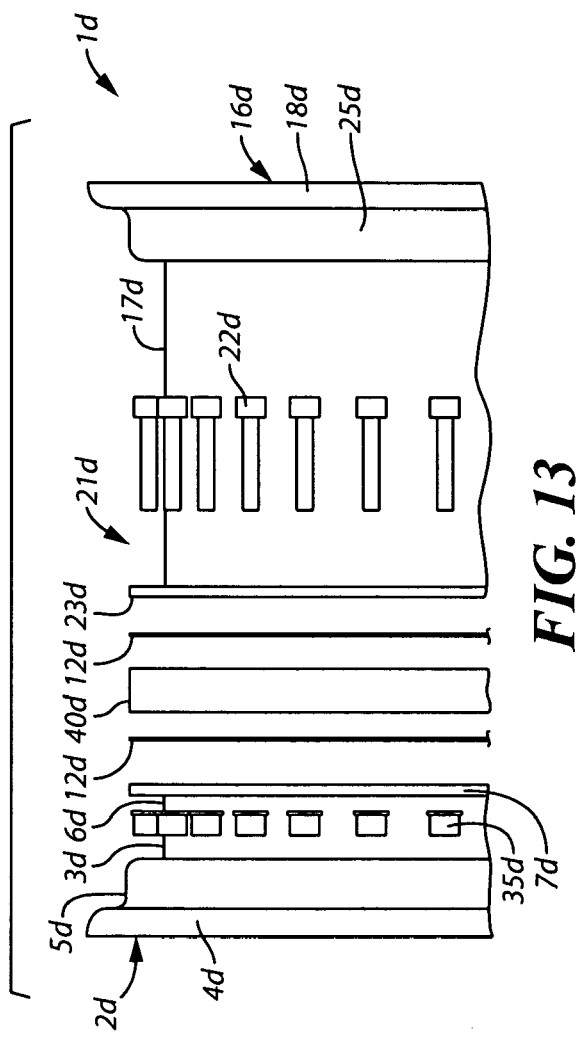
FIG. 13 is an exploded, side view, partially in section, of the three-piece embodiment of the automotive wheel with continuous barrel surface, as shown in FIG. 12, according to the present invention.

Although not shown in the accompanying drawing Figures, the two-piece and three-piece embodiments of the wheel assembly of the present invention preferably incorporate an indexing system for facilitating precise concentric alignment of the individual wheel assembly parts prior to securing the individual components to each other to form the completed assembly. Referring particularly to FIGS. 12-14, a preferred exemplary indexing system will now be described. A flange (not shown) may be provided extending outwardly from the opposite major surfaces of hardware ring 40d. The flange is preferably located on the outer diameter edge of hardware ring 40d, adjacent to the ringbolt openings 41d. For instance, a flange may be provided on both sides of the hardware ring 40d, which extend outward from the outer diameter edge of hardware ring 40d, adjacent to the ringbolt openings 41d. The hardware flange 7d of the outer barrel 2d and hardware flange 23d of the inner barrel 16d, will be of a diameter that provided sized, for being positioned within the flanges on hardware ring 40d. With regard to the two-piece assembly embodiment shown in FIGS. 1-3, a flange (not shown) may extend outwardly on the outer diameter edge of face 19 of inner barrel body 17 adjacent to the assembly fastener openings 20. The hardware flange 7 of the outer barrel 2, will be of a diameter that provided sized, for being positioned within the flange on face 19 of inner barrel body 17. With regard to the two-piece assembly embodiment shown in FIGS. 4-6, a flange (not shown) may extend outwardly on the outer diameter edge of face 9 of the outer barrel body 3a adjacent to the assembly fastener openings 10. The hardware flange 23 of the inner barrel 16a, will be of a diameter that provided sized, for being positioned within the flange on face 9 of outer barrel body 3a. With regard to the three-piece wheel assembly embodiments shown in FIGS. 15-17, a flange (not shown) may be provided on both sides of the hardware ring 40e, which extend outward from the outer diameter edge of hardware ring 40e, adjacent to the ringbolt openings 41e. The face 9e of the outer barrel body 3e and hardware flange 23e of the inner barrel 16e, will be of a diameter that provided sized, for being positioned within the flange. With regard to the three-piece wheel assembly embodiments shown in FIGS. 18-20, a flange (not shown) may be provided on both sides of the hardware ring 40f, which extend outward from the outer diameter edge of hardware ring 40f, adjacent to the ringbolt openings 41f. The face 9f of the outer barrel body 3f and hardware flange 23f of the inner barrel 16f, will be of a diameter that provided sized, for being positioned within the flange.

In typical fabrication of the automotive wheel 1, the outer barrel 2 is attached to the inner barrel 16 typically as follows. The gasket 12, or O-ring and the like, is interposed between the barrel hardware flange 7 of the outer barrel 2 and the outer edge 19 of the inner barrel 16. After the gasket bolt openings 13 in the gasket 12 are aligned to register with the bolt openings 8 in the barrel hardware flange 7 and the edge bolt openings 20 in the outer edge 19 of the inner barrel 16, barrel mount bolts 22 are extended from the barrel depression 6 and through the registering hardware flange bolt openings 8 and gasket bolt openings 13, respectively, and threaded into the respective edge bolt openings 20. As illustrated in FIG. 3, an annular tire mounting depression 6 is defined between the outboard flange 4 of the outer barrel 2 and the inboard flange 18 of the inner barrel 16 to facilitate the mounting of a pneumatic tire (not illustrated) on the automotive wheel 1.

Automotive wheel 1 has a wheel disk 30 that is part of wheel barrel body 17; that is, they comprise a single unitary structure. The wheel disk 30 includes a central hub 31, from which extends multiple spokes 32 having a selected configuration and appearance.

Before assembly of the automotive wheel 1, the outer barrel 2, inner barrel 16 and wheel disk 30, may be subjected to various treatment processes such as polishing, machining, sand blasting, chroming and/or painting, for example, to impart a pleasing aesthetic appearance to the automotive wheel 1 and a generally seamless transition, or "endless lip effect," along the exposed surface. The outer barrel 2 and the inner barrel 16 are subjected to the same type and intensity of treatment to impart a uniform appearance to the automotive wheel 1.

Figure 4:
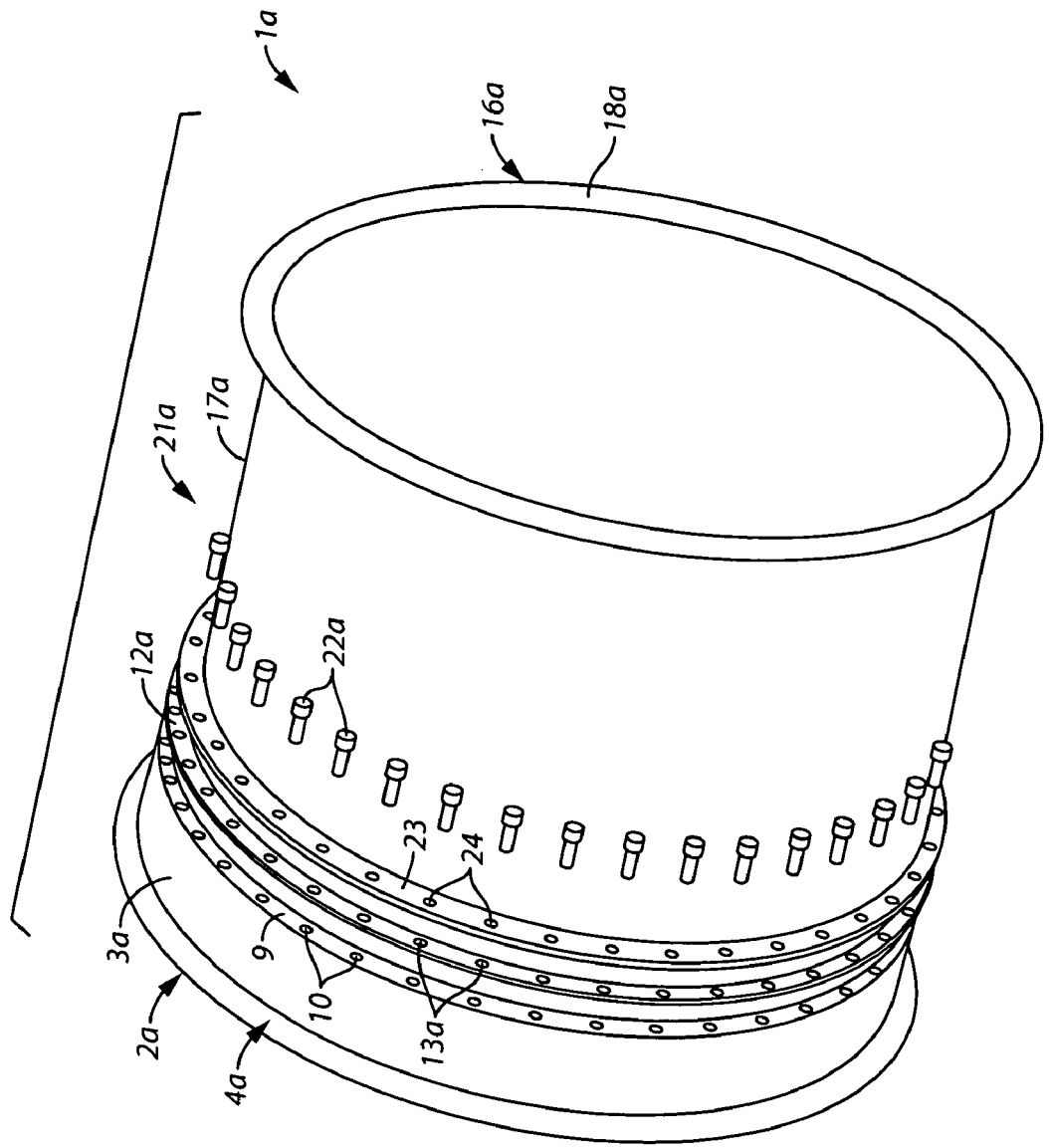
FIG. 4 is a rear exploded, perspective view of a second two-piece embodiment of the automotive wheel with continuous barrel surface according to the present invention.

Referring next to FIGS. 4-6 of the drawings, a second two-piece embodiment of the automotive wheel with continuous barrel surface, hereinafter two-piece automotive wheel, is generally indicated by reference numeral 1a. In the two-piece automotive wheel 1a, the components that generally correspond functionally to the same components of the two-piece automotive wheel 1 that was heretofore described with respect to FIGS. 1-3 are designated by the same reference numerals followed by the letter "a". Accordingly, the two-piece automotive wheel 1a includes an outer barrel 2a that is attached to an inner barrel 16a typically in a manner which will be hereinafter described. The outer barrel 2a includes a generally cylindrical outer barrel body 3a. An outboard flange 4a is formed in the outer edge of the outer barrel body 3a. The outer barrel body 3a further includes an inner edge 9 into which extends multiple, spaced-apart edge bolt openings 10.

The inner barrel 16a includes a generally cylindrical inner barrel body 17a. A barrel hardware flange 23 extends from the outboard edge of the barrel body 17a. Multiple, spaced-apart hardware flange bolt openings 24 extend through the barrel hardware flange 23 and correspond in number and position to the edge bolt openings 10 provided in the inner edge 9 of the outer barrel 2a. As illustrated in FIG. 6, the inner edge of the inner barrel body 17a is typically folded over to form an annular inboard flange 18a in the inner barrel body 17a and an inboard tire bead seat 25 adjacent to the inboard flange 18a. Alternatively, the tire bead seat may comprise an independent annular ring configuration as described hereinabove.

In typical fabrication of the two-piece automotive wheel 1a, an annular gasket 12a, O-ring or the like, which may be silicon, for example, is interposed between the inner edge 9 of the outer barrel 2a and the barrel hardware flange 23 of the inner barrel 16a. Multiple gasket bolt openings 13a extend through the gasket 12a and correspond in number and position to the respective edge bolt openings 10 provided in the inner edge 9 of the outer barrel 2a and the hardware flange bolt openings 24 provided in the barrel hardware flange 23 of the inner barrel 16a. Barrel mount bolts 22a are extended through the registering flange bolt openings 24 and gasket bolt openings 13a, respectively, and threaded into the respective edge bolt openings 10, with the gasket 12a tightly interposed between the inner edge 9 of the outer barrel 2a and the barrel hardware flange 23 of the inner barrel 16a. An annular tire mounting depression 21a is defined between the outboard flange 4a and the inboard flange 18a. A wheel disk (not illustrated), which may or may not be similar in design to the wheel disk 30, which was heretofore described with respect to the two-piece automotive wheel 1 in FIGS. 1-3, forms part of outer barrel 2a, as illustrated in FIGS. 5 and 6, with the spokes 32a and outer barrel 2a comprising a one-piece, or unitary, structure.

Prior to assembly of the two-piece automotive wheel 1a, various treatment processes may be applied to the outer barrel 2a, the wheel disk 30 and the inner barrel 16a, to impart a pleasing aesthetic appearance to the automotive wheel 1a and a generally seamless transition, or "endless lip effect," between the outer barrel 2a and the inner barrel 16a. Preferably, the outer barrel 2a and the inner barrel 16a are subjected to the same type and intensity of treatment to impart a uniform appearance to the two-piece automotive wheel 1a.

Figure 7:
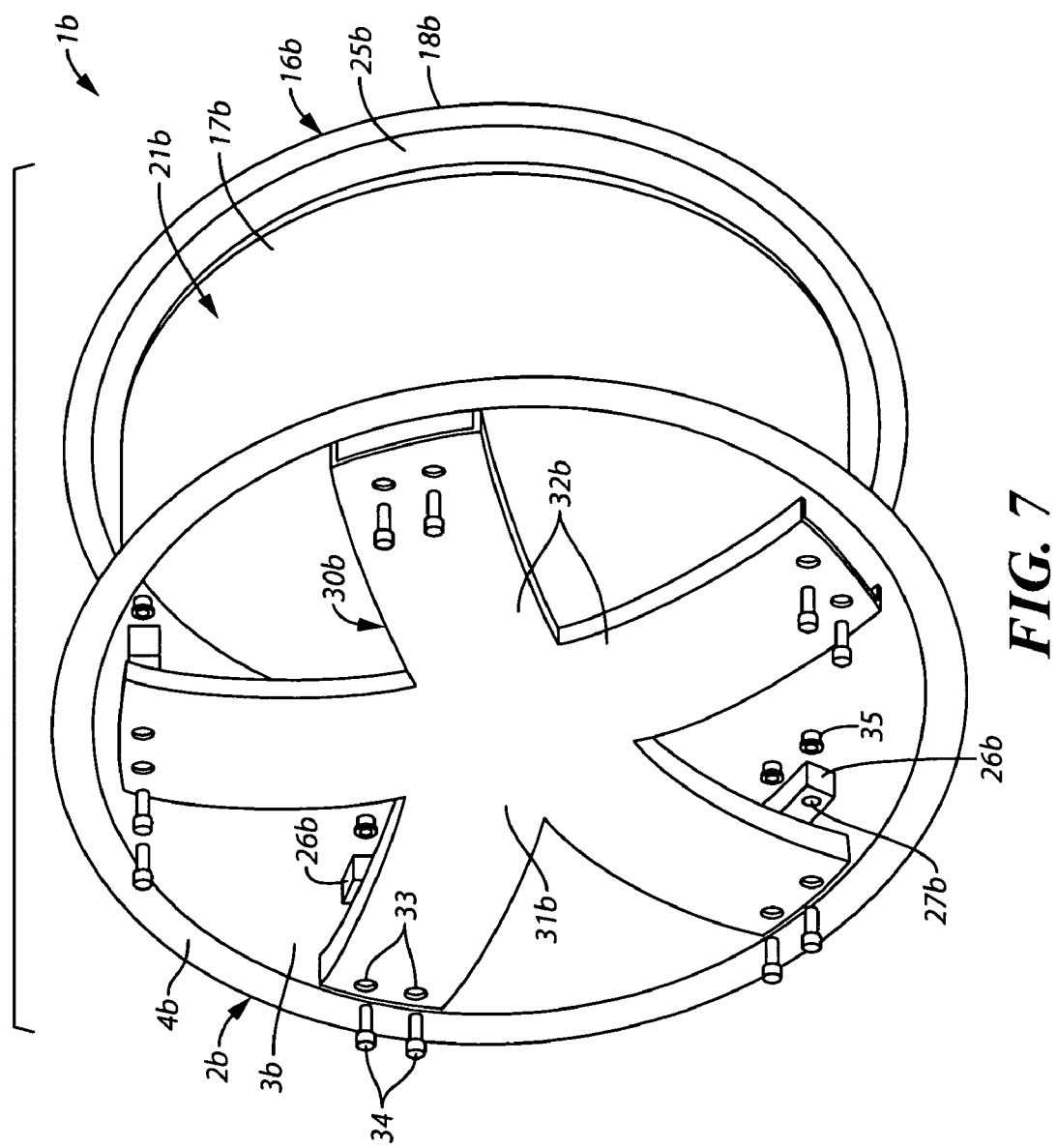
FIG. 7 is a front exploded, perspective view of a third two-piece embodiment of the automotive wheel with continuous barrel surface according to the present invention.
Figure 9:
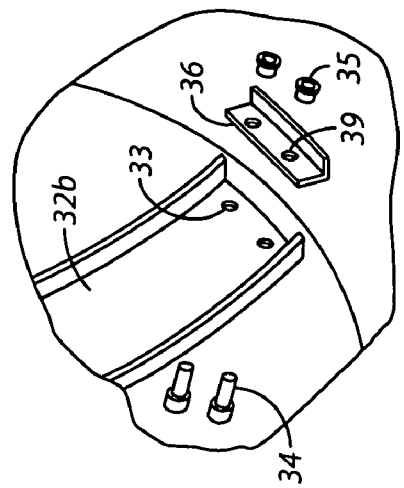
FIG. 9 is an enlarged sectional view of the two-piece automotive wheel with continuous barrel surface shown in FIG. 8, more particularly illustrating an illustrative technique for attaching a spoke to the barrel of the automotive wheel.
Figure 8:
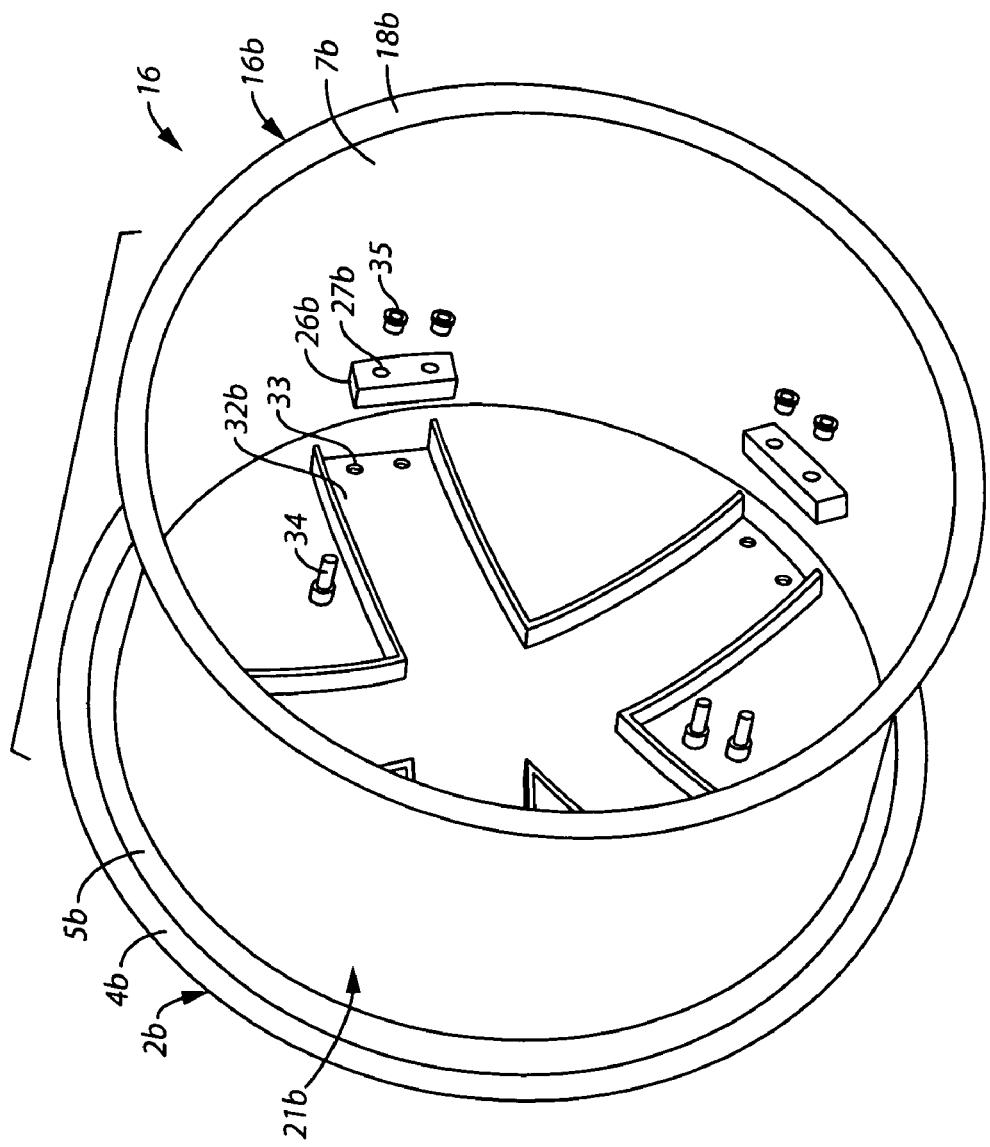
FIG. 8 is a rear exploded, perspective view of the two-piece automotive wheel with continuous barrel surface shown in FIG. 7.

Referring next to FIGS. 7-9 of the drawings, a third two-piece embodiment of the automotive wheel with continuous barrel surface, hereinafter two-piece automotive wheel, of the present invention is generally indicated by reference numeral 1b. In the two-piece automotive wheel 1b, the components that correspond functionally to the same components of the two-piece automotive wheel that was heretofore described with respect to FIGS. 1-3 and 4-6 are designated by the same reference numerals followed by the letter "b". Accordingly, the two-piece automotive wheel 1b includes an outer barrel portion 2b, which is contiguous with an inner barrel portion 16b; that is, the inner and outer barrel portions comprise a single unitary piece. The outer barrel portion 2b includes a generally cylindrical outer barrel body 3b. An outboard flange 4b is formed in the outer edge of the outer barrel body 3b.

The inner barrel portion 16b includes a generally cylindrical inner barrel body 17b. The inner edge of the inner barrel body 17b is typically folded over to form an annular inboard flange 18b in the inner barrel body 17b and an inboard tire bead seat 25b adjacent to the inboard flange 18b. Alternatively, the tire bead seat may comprise an independent annular ring configuration as described hereinabove. A tire mounting depression 21b is defined between the outboard flange 4b and the inboard flange 18b.

A wheel disk 30b is typically mounted in the outer barrel portion 2b of the automotive wheel 1b. The wheel disk 30b typically includes a central hub 31b from which extends multiple spokes 32b. Each of the spokes 32b may generally have a channel shape, as illustrated in FIGS. 8 and 9.

An illustrative technique, which may be used for installing the wheel disk 30b in the outer barrel portion 2b, is illustrated in FIGS. 7 and 8. Accordingly, multiple disk mount portions 26b, or attachment points, which correspond in number to the spokes 32b of the wheel disk 30b, are provided on the visible interior surface of the outer barrel portion 2b. For example, this may be carried out using bolts (not illustrated) or via welding. Alternatively, the disk mount blocks may be formed or otherwise fabricated as part of the barrel. Spaced-apart bolt openings 33 are typically provided in the distal end portion of each spoke 32b, and corresponding spaced-apart bolt openings 27b extend through each disk mount block 26b. The wheel mount disk 30b is attached to the disk mount blocks 26b by aligning the bolt openings 33 in each spoke 32b with the respective bolt openings 27b provided in each disk mount block 26b. Bolts 34 are extended through the bolt openings 33 and registering bolt openings 27b in each disk mount block 26b. Securing nuts 35 are threaded on the respective bolts 34.

An alternative technique for mounting the wheel disk 30b in the outer barrel portion 2b is illustrated in FIG. 9. Accordingly, multiple disk mount flanges 36, which correspond in number to the spokes 32b of the wheel disk 30, are mounted on the interior surface of the outer barrel portion 2b using bolts (not illustrated) or welding, for example. A pair of spaced-apart bolt openings 39 extends through the disk mount flange 36. The bolts 34 are extended through the bolt openings 33 provided in each spoke 32b and through the registering bolt openings 39 provided in the corresponding disk mount flange 36 to mount the wheel disk 30 to the outer barrel portion 2b.

Before assembly of the two-piece automotive wheel 1b, various treatment processes may be applied to the outer barrel portion 2b and the inner barrel portion 16b to impart a pleasing aesthetic appearance to the automotive wheel 1b. Preferably, the outer barrel portion 2b and the inner barrel portion 16b are subjected to the same type and intensity of treatment to impart a uniform appearance to the automotive wheel 1b, as was heretofore described.

Figure 10:
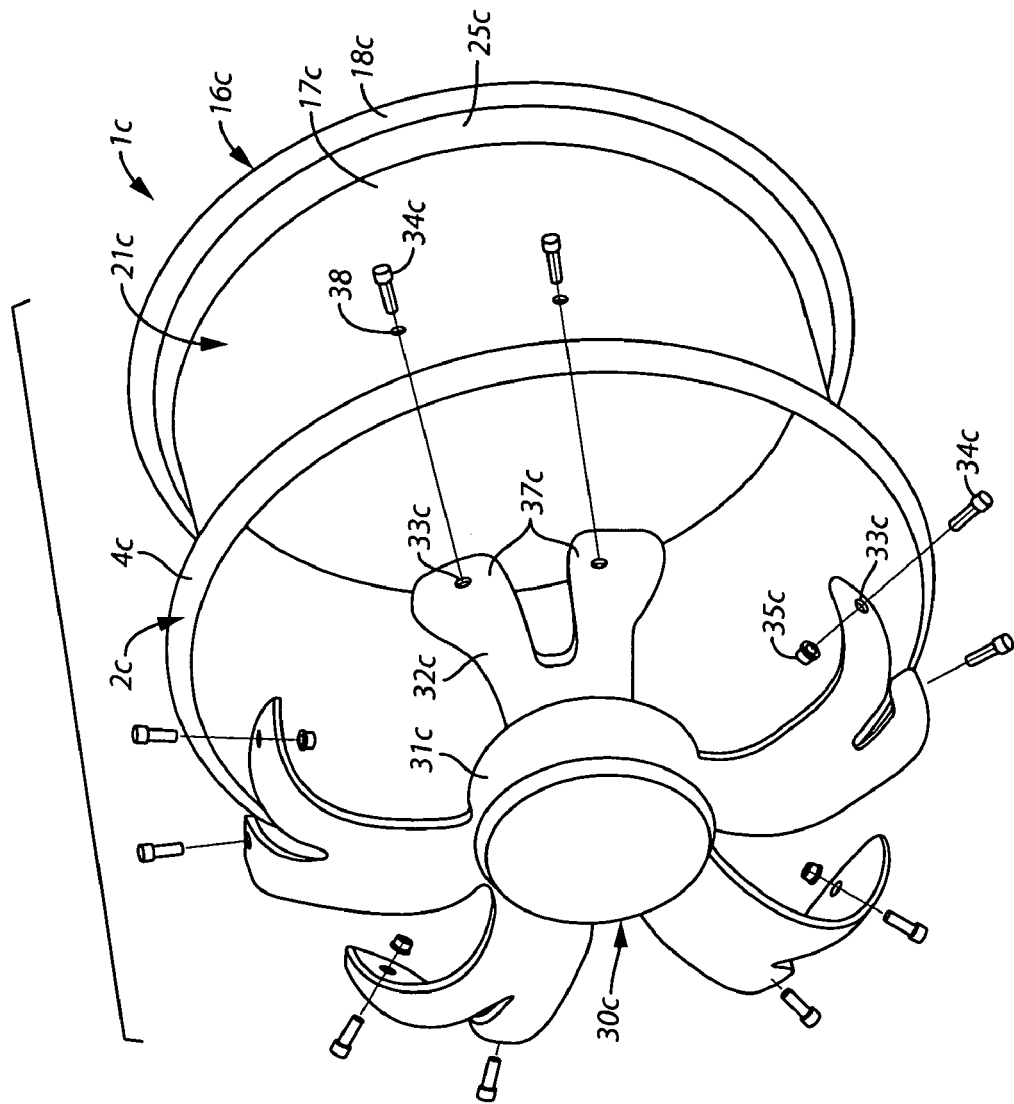
FIG. 10 is a front exploded, perspective view of a fourth two-piece embodiment of the automotive wheel with continuous barrel surface according to the present invention.
Figure 11:
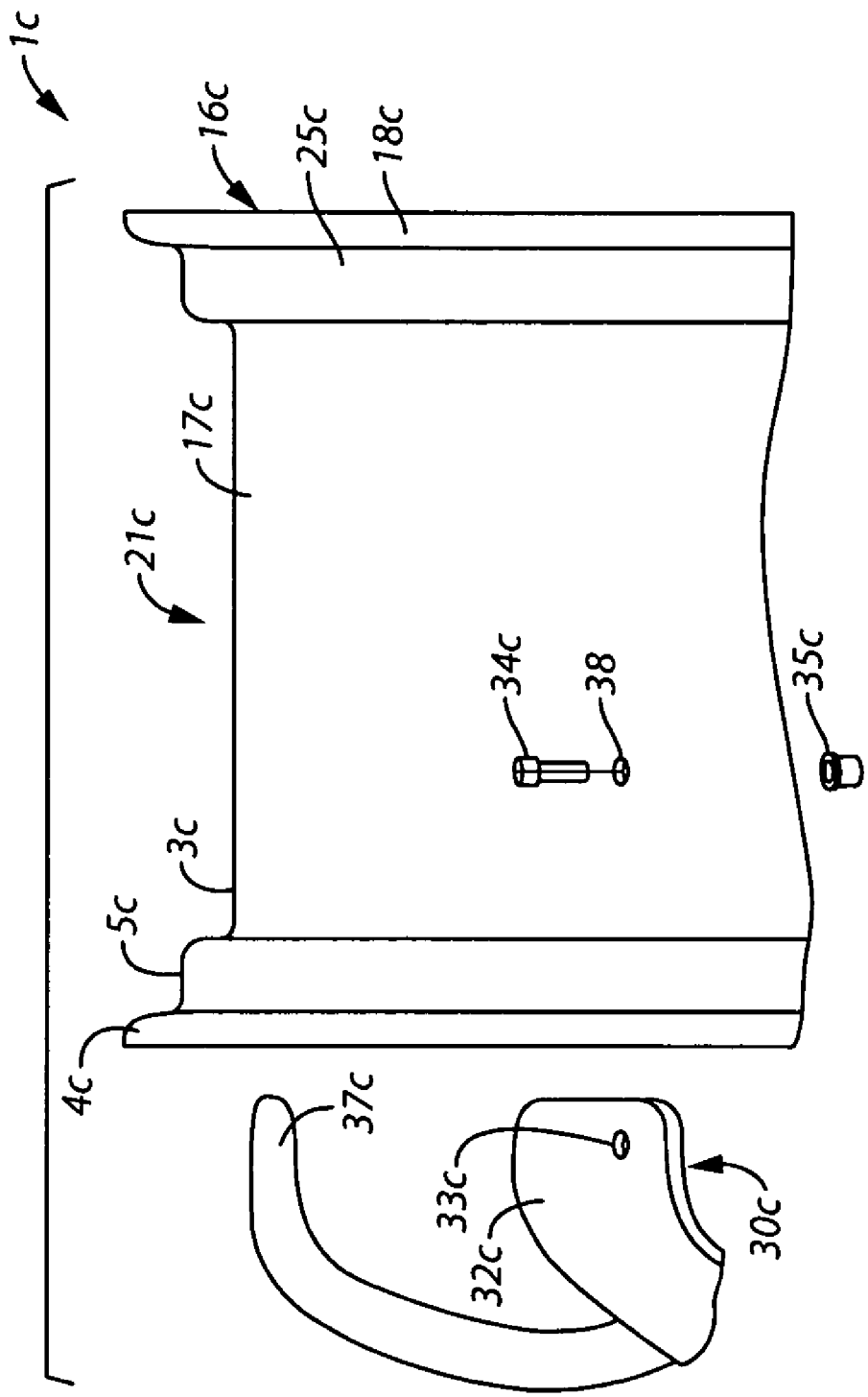
FIG. 11 is a side exploded view, partially in section, of the automotive wheel with continuous barrel surface shown in FIG. 10.

Referring next to FIGS. 10 and 11 of the drawings, a fourth two-piece embodiment of the automotive wheel with continuous barrel surface, hereinafter two-piece automotive wheel, of the present invention is generally indicated by reference numeral 1c. In the two-piece automotive wheel 1c, the components that correspond functionally to the same components of the two-piece automotive wheel 1b that was heretofore described with respect to FIGS. 7-9 are designated by the same reference numerals followed by the letter "c". Accordingly, the two-piece automotive wheel 1c includes an outer barrel portion 2c, which is attached to, or continuous with, an inner barrel 16c. The outer barrel portion 2c includes a generally cylindrical outer barrel body 3c. An outboard flange 4c is formed in the outer edge of the outer barrel body 3c.

The inner barrel 16c includes a generally cylindrical inner barrel body 17c. The inner edge of the inner barrel body 17c is typically folded over to form an annular inboard flange 18c in the inner barrel body 17c and an inboard tire bead seat 25c adjacent to the inboard flange 18c. A tire mounting depression 21c is defined between the outboard flange 4c and the inboard flange 18c.

A wheel disk 30c is typically mounted in the outer barrel portion 2c of the automotive wheel 1c. The wheel disk 30c typically includes a central hub 31c from which extends multiple spokes 32c. For example, each of the spokes 32c may have a generally arcuate shape, with the distal, or extending, end of each spoke 32c split into a pair of spaced-apart, adjacent spoke flanges 37c, as shown. In that case, a bolt opening 33c extends through each spoke flange 37c. As will be apparent to those skilled in the art, this configuration is merely exemplary in nature. For instance, virtually any alternate arrangement incorporating a bolt, or similar fastener, passing through the spokes 32c and then into the barrel, to achieve the desired attachment, can be employed.

Multiple spaced-apart bolt openings 38 extend through the outer barrel body 3c of the outer barrel portion 2c. Each of the bolt openings 38 has a position corresponding to each respective of bolt opening 33c provided in each spoke 32c. According to an illustrative technique that may be used to attach the wheel disk 30c to the outer barrel body 3c, bolts 34c are extended through the respective pairs of bolt openings 38 and registering pairs of bolt openings 33c. A securing nut 35c is threaded on each bolt 34c.

In the two piece automotive wheels heretofore described with respect to FIGS. 1-11, the "endless lip" effect is achieved by relocating the hardware ring or annular ring altogether and re-shaping the outer and inner barrels, or unitary barrel, in such a manner that the tire mounting depression is integrated as part of the new shape. Therefore, the hardware ring no longer separates the inner and outer barrels. Furthermore, the shape of the wheel is not impaired by the necessity of a tire mounting depression, since the shape and form of the inner and outer barrels has been modified to integrate the tire mounting depression. The inner barrel is purposely used as a part of the aesthetic design of the automotive wheel, and therefore, is finished to the same standards as those of the outer barrel.

The defining factors of the "endless lip" effect in the two-piece automotive wheel according to the present invention are as follows. The wheel shape, cross-section or contour includes the tire bead seats, the outboard and inboard flanges, and the tire mounting depression. The inner portion of the wheel is finished to the same standards as the outer portion of the wheel. The spokes of the wheel disk conceal the assembly hardware and attachment points.

Referring next to FIGS. 12-14 of the drawings, a first three-piece embodiment of the automotive wheel with continuous barrel surface, hereinafter three-piece automotive wheel, of the present invention is generally indicated by reference numeral 1d. The three-piece automotive wheel 1d typically includes metallic components, such as aluminum, and has an outer barrel 2d which is attached to the wheel disk 30d and then to an inner barrel 16d typically in a manner which will be hereinafter described. The outer barrel 2d includes a generally cylindrical outer barrel body 3d. The outer edge of the outer barrel body 3d is typically folded over to form an annular, flared outboard flange 4d and an annular outboard tire bead seat 5d adjacent to the outboard flange 4d, as illustrated in FIG. 14. Alternatively, the tire bead seat may comprise an independent annular ring configuration as described hereinabove. An annular barrel hardware flange 7d is provided along the inner edge of the outer barrel body 3d, in spaced-apart relationship to the outboard bead seat 5d. A barrel depression 6d extends between the outboard tire bead seat 5d and the barrel hardware flange 7d. A barrel depression 21d extends between the inboard tire bead seat 25d and the barrel hardware flange 23d. As illustrated in FIG. 12, multiple flange bolt openings 8d extend through the barrel hardware flange 7d, in spaced-apart relationship to each other for purposes which will be hereinafter described.

The inner barrel 16d includes a generally cylindrical inner barrel body 17d. The inboard edge of the inner barrel body 17d is folded inwardly to form an annular inboard flange 18d and an inboard tire bead seat 25d. An annular barrel hardware flange 23d extends outwardly from the outboard edge of the inner barrel body 17d, in spaced-apart relationship to the inboard flange 18d. As illustrated in FIG. 12, multiple flange bolt openings 24d extend through the barrel hardware flange 23d in spaced-apart relationship to each other.

In typical assembly of the three-piece automotive wheel 1d, which will be hereinafter described, a pair of annular gaskets 12d, or O-rings and the like, and a hardware ring portion 40d of the wheel disk 30, are interposed between the outer barrel 2d and the inner barrel 16d. The hardware ring portion 40d is located around the perimeter of the wheel disk 30 at the distal end of the outer wheel spokes 32. Each annular gasket 12d may be constructed from TEFLON, for example, and includes multiple, spaced-apart gasket bolt openings 13d which correspond in number and position to the respective hardware flange bolt openings 8d of the barrel hardware flange 7d and the hardware flange bolt openings 24d of the barrel hardware flange 23d. The hardware ring 40d includes multiple ringbolt openings 41d which correspond in number and position to the respective gasket bolt openings 13d in each gasket 12d and the hardware flange bolt openings 8d of the barrel hardware flange 7d and the hardware flange bolt openings 24d of the barrel hardware flange 23d, as illustrated in FIG. 12.

In fabrication of the automotive wheel 1d, the outer barrel 2d is attached to the inner barrel 16d typically as follows. The hardware ring 40d is interposed between the gaskets 12d, and the gaskets 12d and sandwiched hardware ring 40d are interposed between the barrel hardware flange 7d of the outer barrel 2d and the barrel hardware flange 23d of the inner barrel 16d. After the gasket bolt openings 13d in the gaskets 12d and the ring bolt openings 41d in the hardware ring 40d are aligned to register with the flange bolt openings 8d in the barrel hardware flange 7d of the outer barrel 2d and the flange bolt openings 24d in the barrel hardware flange 23d of the inner barrel 16d, barrel mount bolts 22d are extended through the registering flange bolt openings 24d, and gasket bolt openings 13d, ring bolt openings 41d, gasket bolt openings 13d and flange bolt openings 8d, respectively. Securing nuts 35d are threaded on the respective barrel mount bolts 22d to secure the gaskets 12d and hardware ring 40d between the barrel hardware flange 7d of the outer barrel 2d and the barrel hardware flange 23d of the inner barrel 16d. As illustrated in FIG. 13, an annular tire mounting depression 21d is defined between the outboard flange 4d of the outer barrel 2d and the inboard flange 18d of the inner barrel 16d.

Various pre-assembly treatment processes may be applied to the outer barrel 2d and the inner barrel 16d and wheel disk 30d to impart a pleasing aesthetic appearance to the automotive wheel 1d. Preferably, the outer barrel 2d and the inner barrel 16d are subjected to the same type and intensity of treatment to impart a uniform appearance to the automotive wheel 1d, as was heretofore described.

Figure 15:
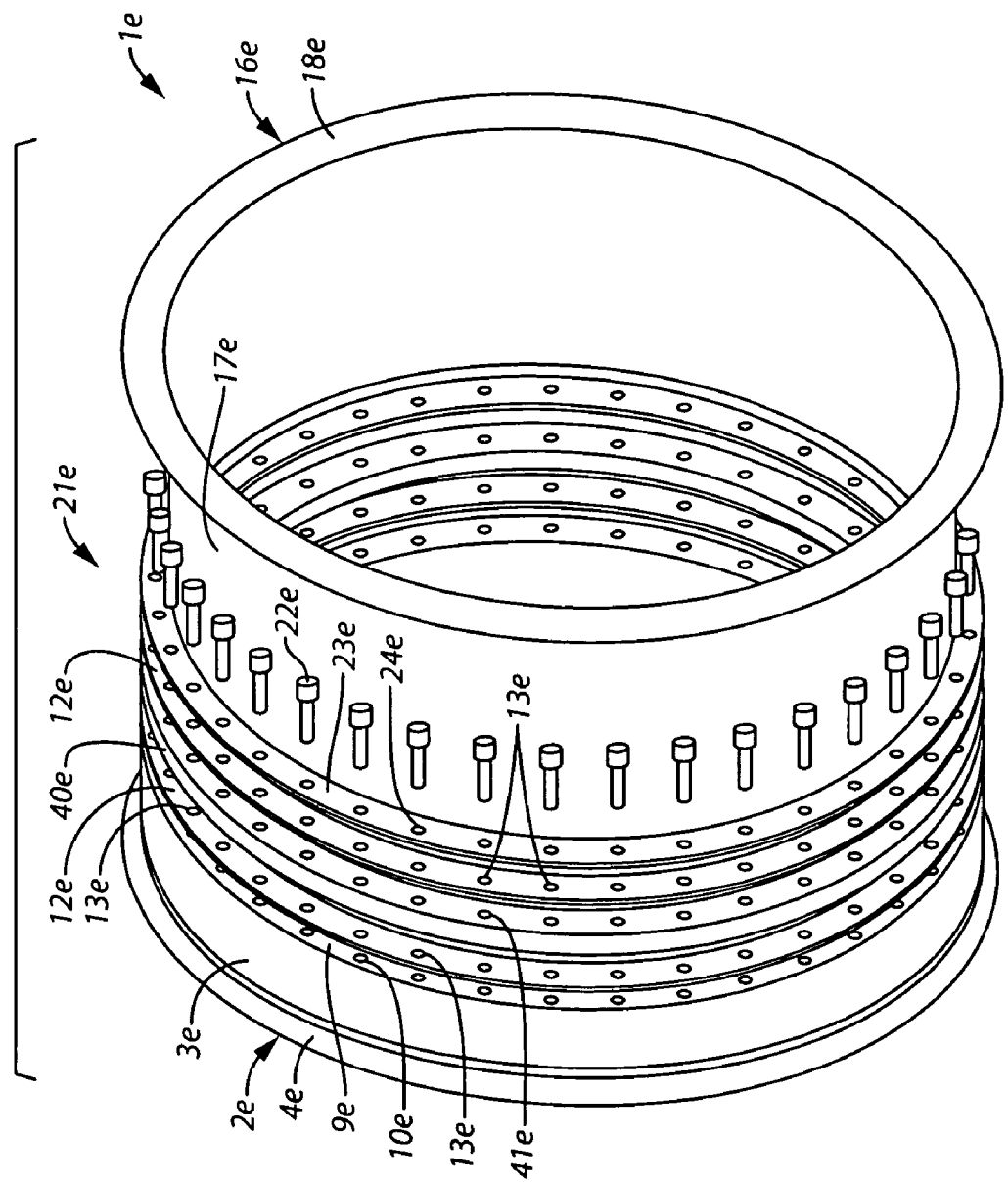
FIG. 15 is a rear, exploded perspective view of a second three-piece embodiment of the automotive wheel with continuous barrel surface according to the present invention.

Referring next to FIGS. 15-17 of the drawings, a second three-piece embodiment of the automotive wheel with continuous barrel surface according to the present invention is generally indicated by reference numeral 1e. In the three-piece automotive wheel 1e, the components that correspond functionally to the same components of the three-piece automotive wheel 1d that was heretofore described with respect to FIGS. 12-14 are designated by the same reference numerals followed by the letter "e". The designs of the two embodiments are generally the same except that in the three-piece automotive wheel 1e, the outboard tire bead seat 5e (not illustrated) extends as a continuous surface to form the outer barrel body 3e, as illustrated in FIG. 17. Furthermore, multiple edge bolt openings 10e extend into the inner edge 9e of the outer barrel body 3e.

Fabrication of the three-piece automotive wheel 1e is typically achieved, as was heretofore described with respect to the three-piece automotive wheel 1d, by positioning gaskets 12e and a hardware ring 40e between the barrel hardware flange 23e of the inner barrel 16e and the inner edge 9e of the outer barrel body 3e, as illustrated in FIG. 16; extending barrel mount bolts 22e through registering flange bolt openings 24e, gasket bolt openings 13e, ring bolt openings 41e and gasket bolt openings 13e, respectively, provided in the barrel hardware flange 23, gasket 12e, hardware ring 40e and gasket 12e, respectively; and threading the barrel mount bolts 22e into the respective edge bolt openings 10e provided in the inner edge 9e of the outer barrel body 3e. As illustrated in FIG. 16, an annular tire mounting depression 21e is defined between the outboard flange 4e of the outer barrel 2e and the inboard flange 18e of the inner barrel 16e.

Various pre-assembly treatment processes may be applied to the outer barrel 2e and the inner barrel 16e and the wheel disk 30e to impart a pleasing aesthetic appearance to the three-piece automotive wheel 1e. Preferably, the outer barrel 2e and the inner barrel 16e are subjected to the same type and intensity of treatment to impart a uniform appearance to the three-piece automotive wheel 1e, as was heretofore described.

Figure 18:
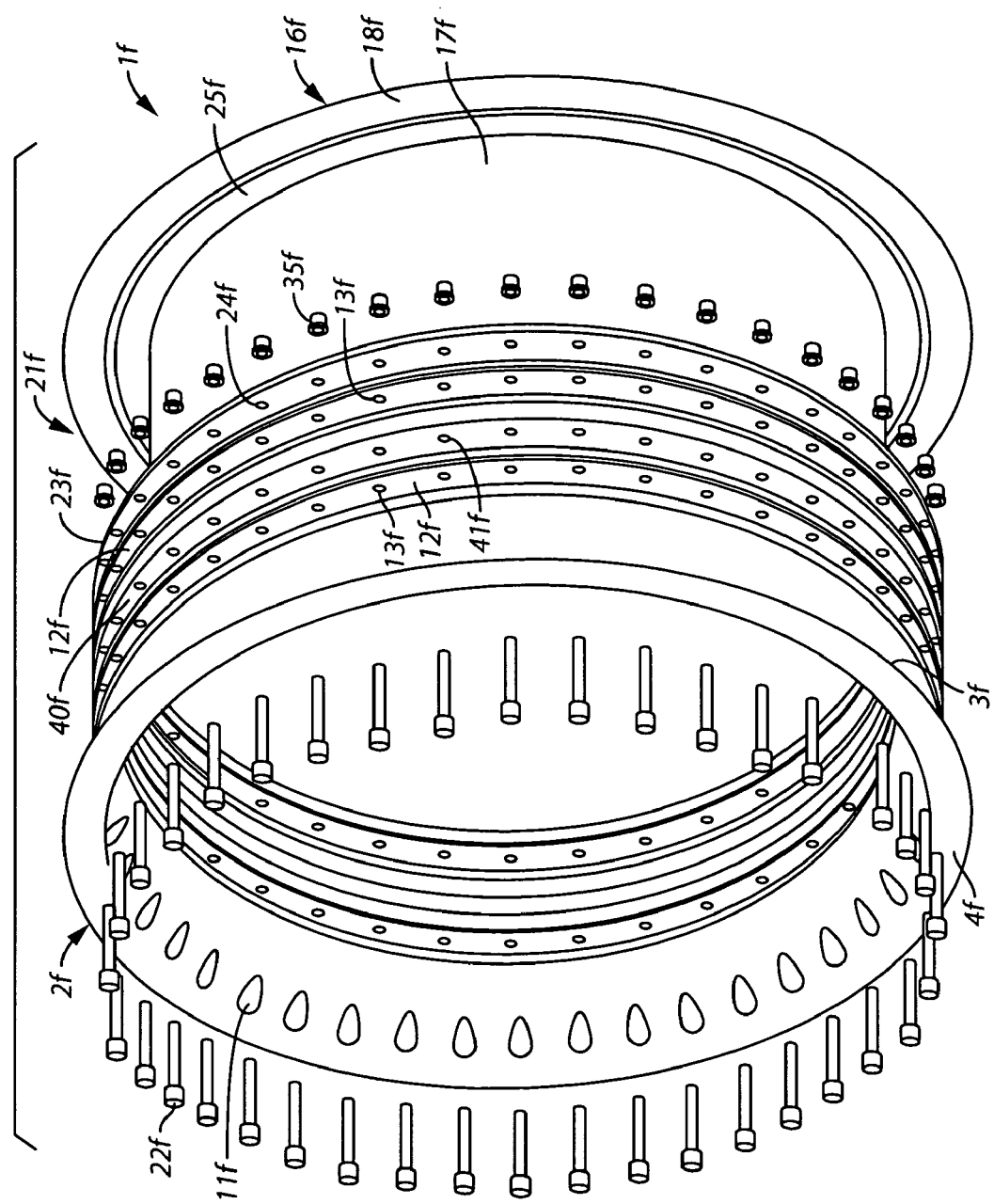
FIG. 18 is a front exploded, perspective view of a third three-piece embodiment of the automotive wheel with continuous barrel surface according to the present invention.

Referring next to FIGS. 18-20 of the drawings, a third three-piece embodiment of the automotive wheel with continuous barrel surface, hereinafter three-piece automotive wheel, according to the present invention is generally indicated by reference numeral 1f. In the three-piece automotive wheel 1f, the components that correspond functionally to the same components of the three-piece automotive wheel 1e that was heretofore described with respect to FIGS. 15-17 are designated by the same reference numeral followed by the letter "f". The designs of the two embodiments are generally the same except that in the three-piece automotive wheel 1f, bolt cavities 11f extend into the front inner surface of the outer barrel body 3f. Furthermore, as illustrated in FIG. 20, edge bolt openings 10f extend into the inner edge 9f of the outer barrel body 3f and communicate with the respective bolt cavities 11f.

Fabrication of the three-piece automotive wheel 1f is carried out typically by positioning gaskets 12f and a hardware ring 40f between the barrel hardware flange 23f of the inner barrel 16f and the inner edge 9f of the outer barrel body 3f, as illustrated in FIG. 19; extending barrel mount bolts 22f through the respective bolt cavities 11f and edge bolt openings 10f and the registering gasket bolt openings 13f, ring bolt openings 41f, gasket bolt openings 13f and flange bolt openings 24f, respectively, provided in the gasket 12f, hardware ring 40f, gasket 12f and barrel hardware flange 23f, respectively; and threading securing nuts 35f onto the respective barrel mount bolts 22f. As illustrated in FIG. 20, an annular tire mounting depression 21f is defined between the outboard flange 4f of the outer barrel 2f and the inboard flange 18f of the inner barrel 16f.

Various pre-assembly treatment processes may be applied to the outer barrel 2f and the inner barrel 16f and the wheel disk 30f to impart a pleasing aesthetic appearance to the three-piece automotive wheel 1f. Preferably, the outer barrel 2f and the inner barrel 16f are subjected to the same type and intensity of treatment to impart a uniform appearance to the three-piece automotive wheel 1f, as was heretofore described.

In the three-piece automotive wheels that were heretofore described with respect to FIGS. 12-20, the "endless lip" effect is achieved by placing the hardware ring inside the tire chamber defined by the tire mounting depression and pneumatic tire. Therefore, the outer and inner barrels are flush with the inner circumference of the hardware ring, thereby creating a smooth and continuous transition between the outer and inner barrel surfaces. Furthermore, the hardware ring is concealed. This consequently provides sufficient space within the tire chamber to facilitate the tire-mounting process. The inner barrel is purposely used as a part of the aesthetic design of the automotive wheel, and therefore, is finished to the same standards as those of the outer barrel.

The defining factors of the "endless lip" effect in the three-piece automotive wheels according to the present invention are as follows. The outer and inner barrel shapes, cross-sections or contours include the tire bead seats, the outboard and inboard flanges, and hardware flanges. The surfaces of the inner and outer barrels meet the hardware ring flush on its inner circumference. The new barrel shape incorporates the tire mounting depression. The inner portion of the wheel is finished to the same standards as the outer portion of the wheel.

The present invention further contemplates a one-piece embodiment (not illustrated) of the automotive wheel. The one-piece automotive wheel is typically cast, flow-formed or machined out of a single piece alloy forging. The one-piece automotive wheel includes a barrel having a generally cylindrical barrel body. An outboard flange extends from the outboard edge of the barrel body and an inboard flange extends from the inboard edge of the barrel body. A tire mounting depression is defined between the outboard flange and the inboard flange. An outboard tire bead seat may be provided adjacent to the outboard flange. An inboard tire bead seat may be provided adjacent to the inboard flange. The one-piece automotive wheel typically further includes a wheel disk, which may include a hub and multiple spokes extending outwardly from the hub. The wheel disk, hub and spokes as well as the outer and inner barrels by definition comprise a single unitary piece.

To achieve the "endless lip effect" on a cast one-piece automotive wheel, the mold halves must meet flush with each other during casting. The resulting seam is then machined smooth to create a seamless transition between the barrel portions. The single-piece automotive wheel is then painted, polished, machined, sandblasted, chromed or subjected to other post-assembly processing to render the single-piece automotive wheel aesthetically pleasing. The outer and inner portions of the barrel are subjected to the same type and intensity of treatment to impart a uniform appearance to the one-piece automotive wheel.

If the one-piece automotive wheel is forged, then the lack of an annular ring and the barrel contour that incorporates the tire mounting depression are made parts of the design of the wheel. The final forged wheel assembly is then painted, polished, machined, sand blasted, chromed or subjected to other processing to render the single-piece automotive wheel aesthetically pleasing. The outer barrel and the inner barrel are subjected to the same type and intensity of treatment to impart a uniform appearance to the one-piece automotive wheel.

The defining factors of the "endless lip" effect in a single-piece automotive wheel are as follows: the casting seam, if any, is machined smooth in the areas around the surface of the barrel. The barrel shape, cross-section or contour includes the tire bead seats, outboard and inboard flanges and tire mounting depression. The inner portion of the barrel is finished to the same standards as those of the outer portion of the barrel.

Although not shown in the accompanying drawing Figures, the wheel assembly of the present invention may incorporate a cap screw configured for removable attachment to the hardware ring 40. The wheel assembly of the present invention preferably incorporates an air valve system identical or similar to known flush mount air valve systems. In such systems, the commonly recognized air fill post that accepts the pressurized air hose fitting is removable. In the wheel assembly of the present invention, a decorative, yet functional, cap screw is inserted. The cap screw serves to cover the opening created by the removal of the air fill post, not only improving the aesthetics but also preventing the introduction of dirt and other unwanted contaminants. For example, referring to FIGS. 12-14, preferably, the air valve opening (not shown) would be located on the hardware ring 40d between, and perpendicular to, any two adjacent ringbolt openings 41d. In this manner, one end of the air valve will remain in the tire chamber side of the hardware ring (i.e., its outer circumference), and the other side would be on the visible side of the hardware ring (i.e., its inner circumference). Ideally, the air valve system used will incorporate a check valve assembly that allows the ingress of air, while restricting egress of air from the tire chamber, which assemblies are well known in the tire arts. The use of a screw-in air fill post and cap screw functions to preserve the endless lip effect of the present invention, while providing a design adapted for enabling conventional air pressure filling and maintenance practices.

It is common practice to mount a tire to an outer edge of a wheel assembly. The tire is mounted sealing each tire bead against a respective rim or flange of the wheel assembly. The configuration creates an air chamber. An inboard bead of a tire is seated against the inboard flange 18 and an outboard bead is seated against the outboard flange 4. A peripheral, outer edge of the barrel assembly: is formed by the following assembled elements: the annular, flared outboard flange 4, annular outboard tire bead seat 5, barrel tire mounting depression 6, inner barrel body 17, and annular inboard flange 18. The installed tire combines with the peripheral, outer edge of the barrel assembly to form an air chamber. The section of the air chamber provided by the peripheral, outer edge of the barrel assembly can be referred to as a rim provided air chamber portion The section of the air chamber provided by the peripheral, outer edge of the barrel assembly can be referred to as a provided air chamber rim section. Thus, the air receiving chamber portion defined as being a region formed between the air receiving chamber rim section and the installed tire.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An automotive wheel, comprising:
   an inner barrel having an inboard flange, an inner barrel hardware mounting flange, and an inner barrel body disposed between the inner barrel inboard flange and the inner barrel hardware mounting flange;
   an outer barrel having an outboard flange and an outer barrel hardware mounting flange with an outer barrel body disposed between the outer barrel outboard flange and the outer barrel hardware mounting flange;
   an air receiving chamber rim section defined as being a radially outward side of the wheel circumferentially formed by the inboard flange, the inner barrel body, the outer barrel body, and said outboard flange, wherein the inner barrel hardware mounting flange and the outer barrel hardware mounting flange extend into an air receiving chamber defined as being a region formed between the air receiving chamber rim section and an installed tire; and
   a fastening system securing said outer barrel hardware mounting flange and said inner barrel hardware mounting flange to form a wheel assembly, wherein visible portions of the fastening system are disposed exclusively within the air receiving chamber.

2. An automotive wheel as recited in claim 1, the wheel further comprising a hardware ring portion of a wheel disk interposed between the outer barrel and the inner barrel.

3. An automotive wheel as recited in claim 2, wherein the fastening system extends through multiple flange openings provided in the hardware ring portion of a wheel disk, the outer barrel, and the inner barrel.

4. An automotive wheel as recited in claim 1, the wheel further comprising a first tire bead seat located proximate to the inboard flange and a second tire bead seat located proximate the outboard flange.

5. An automotive wheel as recited in claim 4, the wheel further comprising at least one barrel depression disposed upon at least one of the barrel bodies, the barrel depression having a radial distance, measured from a wheel axial centerline, that is less than a radial distance measured between the tire bead and the wheel axial centerline.

6. An automotive wheel as recited in claim 4, wherein the fastening system is positioned entirely between a radial position of the tire bead seat and the rotational center of the wheel assembly.

7. An automotive wheel as recited in claim 1, the wheel further comprising at least one annular gasket provided between said inboard flange and said outboard flange.

8. An automotive wheel as recited in claim 1, wherein the fastening system extends through multiple flange openings of the outer barrel and the inner barrel.

9. An automotive wheel, comprising:
an inner barrel having an inboard flange, an inner barrel hardware mounting face, and an inner barrel body disposed between the inner barrel inboard flange and the inner barrel hardware mounting face;
an outer barrel having an outboard flange and an outer barrel hardware mounting face with an outer barrel body disposed between the outer barrel outboard flange and the outer barrel hardware mounting face;
an air receiving chamber rim section defined as being a radially outward side of the wheel circumferentially formed by said inboard flange, said inner and outer barrel bodies, and the outboard flange, wherein at least one of said inner barrel hardware mounting face and said outer barrel hardware mounting face is a flange and the opposing hardware mounting face comprising a hardware receiving feature; and
a fastening system securing said outer barrel hardware mounting face and said inner barrel hardware mounting face to form a wheel assembly, wherein any visible portions of the fastening system are disposed exclusively within an air receiving chamber defined as being a region formed between the air receiving chamber rim section and an installed tire.

10. An automotive wheel as recited in claim 9, the wheel further comprising a hardware ring portion of a wheel disk interposed between the outer barrel and the inner barrel.

11. An automotive wheel as recited in claim 10, wherein the fastening system extends through multiple openings provided in the hardware ring portion of a wheel disk, the outer barrel, and the inner barrel.

12. An automotive wheel as recited in claim 9, the wheel further comprising a first tire bead seat located proximate to the inboard flange and a second tire bead seat located proximate the outboard flange.

13. An automotive wheel as recited in claim 12, the wheel further comprising at least one barrel depression disposed upon at least one of the barrel bodies, the barrel depression having a radial distance, measured from a wheel axial centerline, that is less than a radial distance measured between the tire bead and the wheel axial centerline.

14. An automotive wheel as recited in claim 12, wherein the fastening system is positioned entirely between a radial position of tire bead seat and the rotational center of the wheel assembly.

15. An automotive wheel as recited in claim 9, the wheel further comprising at least one annular gasket provided between said inboard mounting face and said outboard mounting face.

16. An automotive wheel as recited in claim 9, wherein the fastening system extends through multiple openings of the outer barrel and the inner barrel.

17. An automotive wheel, the wheel comprising:
an inner barrel having an inboard flange, an inner barrel hardware mounting face, and an inner barrel body disposed between the inner barrel inboard flange and the inner barrel hardware mounting face;
an outer barrel having an outboard flange and an outer barrel hardware mounting face with an outer barrel body disposed between the outer barrel outboard flange and the outer barrel hardware mounting face;
a first tire bead seat located proximate to the inboard flange and a second tire bead seat located proximate the outboard flange;
an air receiving chamber rim section defined as being a radially outward side of the wheel circumferentially formed by said inboard flange, said inner and outer barrel bodies, and the outboard flange;
at least one barrel depression disposed upon at least one barrel body at a radial distance from a wheel axial centerline that is smaller than a radial distance between the tire bead seat and the wheel axial centerline;
a fastening system securing said outer barrel hardware mounting face and said inner barrel hardware mounting face forming a wheel assembly, wherein visible portions of the fastening system are disposed exclusively within the portion of the an air receiving chamber defined as being a region formed between the air receiving chamber rim section and an installed tire.

18. An automotive wheel as recited in claim 17, wherein the fastening system is positioned entirely between a radial position of the tire bead seat and the rotational center of the wheel assembly.

19. An automotive wheel as recited in claim 17, wherein at least one barrel hardware mounting face is a flange.

20. An automotive wheel as recited in claim 19, wherein the fastening system extends through a plurality of openings provided in the flange.

21. An automotive wheel as recited in claim 17, the wheel further comprising a hardware ring portion of a wheel disk interposed between the outer barrel and the inner barrel.

* * * * *